United States Patent
Aesch, Jr.

(10) Patent No.: US 7,497,047 B1
(45) Date of Patent: Mar. 3, 2009

(54) TERMITE EXTERMINATION METHOD AND MONITOR

(76) Inventor: Harold W. Aesch, Jr., 7225 W. Galveston St., Suite #1, Chandler, AZ (US) 85226

( * ) Notice: Subject to any disclaimer, the term of this patent is extended or adjusted under 35 U.S.C. 154(b) by 159 days.

(21) Appl. No.: 11/102,959

(22) Filed: Apr. 11, 2005

Related U.S. Application Data

(63) Continuation-in-part of application No. 10/864,195, filed on Jun. 9, 2004, now abandoned, which is a continuation-in-part of application No. 10/795,690, filed on Mar. 6, 2004.

(51) Int. Cl.
*A01M 1/20* (2006.01)
(52) U.S. Cl. .................................... 43/132.1
(58) Field of Classification Search ............... 43/124, 43/132.1, 131
See application file for complete search history.

(56) References Cited

U.S. PATENT DOCUMENTS

| | | | | |
|---|---|---|---|---|
| 3,564,750 A | * | 2/1971 | Burgess | 43/107 |
| 5,329,726 A | * | 7/1994 | Thorne et al. | 43/124 |
| 5,571,967 A | * | 11/1996 | Tanaka et al. | 73/587 |
| 5,832,658 A | * | 11/1998 | Randon | 43/131 |
| 5,899,018 A | * | 5/1999 | Gordon et al. | 43/131 |
| 5,901,496 A | * | 5/1999 | Woodruff | 43/124 |
| 5,950,356 A | * | 9/1999 | Nimocks | 43/131 |
| 6,052,066 A | * | 4/2000 | Su | 340/870.16 |
| 6,100,805 A | * | 8/2000 | Lake | 340/573.1 |
| 6,266,918 B1 | * | 7/2001 | Henderson et al. | 43/131 |
| 6,370,811 B1 | * | 4/2002 | Masterson | 43/121 |
| 6,584,728 B2 | | 7/2003 | Aesch, Jr. | |
| 6,681,518 B2 | | 1/2004 | Aesch, Jr. | |
| 6,834,611 B2 | * | 12/2004 | Berthold et al. | 116/281 |

* cited by examiner

*Primary Examiner*—Kurt Rowan
(74) *Attorney, Agent, or Firm*—John D. Lister

(57) ABSTRACT

A method for detecting the presence of termites and killing termites by exposing the termites to a termiticide, includes locating a monitoring device in ground adjacent a building. The monitoring device has an integral termite indicator mechanism for indicating the presence of termites within the monitoring device that provides an aboveground visible signal that termites are present within the monitoring device. The termite indicator mechanism is actuated by a trigger mechanism that includes a termite food source that, when fed upon by termites, actuates the visible signal of the termite indicator mechanism to indicate the presence of termites in the monitoring device. After the visible signal has been actuated, a termiticide is introduced into the monitoring device and/or the ground adjacent the monitoring device to expose termites to the termiticide as the termites pass between a termite colony and the monitoring device and/or feed within the monitoring device.

13 Claims, 5 Drawing Sheets

TERMITE EXTERMINATION METHOD AND MONITOR

This patent application is a continuation-in-part of patent application Ser. No. 10/864,195 filed Jun. 9, 2004, which is a continuation-in-part of patent application Ser. No. 10/795,690 filed Mar. 6, 2004.

BACKGROUND OF THE INVENTION

The subject invention relates to method for monitoring for the presence of termites and exterminating termites once their presence is detected and to a termite-monitoring device especially adapted for use in the method of the subject invention as well as other methods.

Termites do more property damage in the United States than hurricanes, earthquakes and vandalism combined. In order to control termites with a toxicant (hereinafter "termiticide"), termites must come in contact with the termiticide. Termites ingress and egress a food source through underground and above ground tunnel tubes which extend between a colony nest and the food source, e.g. a building. These tunnel tubes are climate controlled and impervious to termiticides sprayed on the soil and, for as long as the termites remain sealed within their tunnel tubes, the termites are protected from contact with the termiticides sprayed on the soil.

While many methods have been used to exterminate termites, a need has remained to provide a method for exterminating termites and termite colonies: that is inexpensive, highly effective, and easy to monitor; that does not require the use of a termite-monitoring device that includes a toxic termite food source prior to the detection of termites; that permits the detection of termite activity with little or no disturbance of the termites; that gives the service technician the flexibility of treating the termites feeding on a termite food source within a termite-monitoring device with a termiticide with or without contaminating the termite food source within the termite-monitoring device; and that, preferably, utilizes a termiticide which is non-repellent to termites and lethal to termites through matrix contact as well as ingestion and/or transferal.

SUMMARY OF THE INVENTION

The method and termite-monitoring device of the subject invention accomplish all of the goals listed immediately above. In the method of the subject invention for detecting the presence of and exterminating termites by exposing the termites to a termiticide, one or more termite-monitoring devices are located in the ground adjacent a building structure. The one or more termite-monitoring devices each, preferably, contain a nontoxic termite food source and have a termite indicator mechanism for indicating the presence of termites within the monitoring device that provides an above-ground visible signal that termites are present within the monitoring device. Preferably, the termite-monitoring devices each have a trigger mechanism therein that includes a nontoxic termite food source. When termites feed upon the nontoxic termite food source, the termite indicator mechanism is actuated to provide the visible signal that indicates termites are present in the monitoring device. Once a termite-monitoring device indicates the presence of termites, a termiticide is introduced into the monitoring device and/or the ground adjacent the monitoring device to expose the termites to the termiticide as the termites pass between a termite colony and the monitoring device and/or feed within the monitoring device.

Preferred termite-monitoring devices of the subject invention for use in the method of the subject invention each have a tubular housing for containing a termite food source. The housing has an upper end, a lower end, a tubular sidewall and an opening or plurality of openings to permit below ground termite housing ingress and egress. A closure component closes an opening in the upper end of the housing and has a termite indicator mechanism therein that is actuated by a trigger mechanism. The trigger mechanism includes a rod that is secured to and extends from the termite indicator mechanism into the tubular housing where a lower end portion of the rod is secured. In one preferred embodiment of the invention the rod is secured to and extends from the termite indicator mechanism through the tubular housing to a bottom wall of the housing where a bottom end portion of the rod is secured. In another preferred embodiment of the invention the rod is secured to and extends from the termite indicator mechanism into the tubular housing where a spacer engages a lower end portion of the rod to secure and maintain the lower end portion of the rod in a spaced relationship to the closure component. The rod of the trigger mechanism includes, at least in part, a termite food source portion. When the termite food source portion of the rod is partially consumed by termites the rod is weakened until the rod is separable at the termite food portion by a force applied to the trigger mechanism at least in part by the termite indicator mechanism. The termite indicator mechanism includes a signal component that is normally held in a first position when the rod of the trigger mechanism is intact and a spring. When the rod of the trigger mechanism is weakened at the termite food source portion by feeding termites, the forces exerted on the termite food source portion of the rod by the spring of the termite indicator mechanism separate or help to separate the rod so that the rod of the trigger mechanism is no longer intact. Simultaneously with the separation of the rod, the spring urges the signal component of the termite indicator mechanism upward from the first position to a second elevated position where an upper portion of the signal component projects above the top side of the closure component to provide a visible signal above the closure component that termites are present within the monitoring device.

When the rod of the trigger mechanism is intact, the indicator mechanism is housed within a hole passing from the topside to the bottom side of the closure component. In some embodiments of the invention, after the rod of the trigger mechanism has been separated and the signal component has been urged upward to the second elevated position where the upper portion of the signal component projects above the top side of the closure component to provide the visible signal above the closure component that termites are present within the monitoring device, the indicator mechanism along with an upper portion of the trigger mechanism may be pulled from the closure component. This clears the hole in the closure component so that the interior of the monitoring device may be visibly or otherwise inspected for termites and/or a termiticide can be introduced into the monitoring device through the closure component. In these embodiments, after the indicator mechanism and the upper portion of the trigger mechanism have been removed from the closure component to visibly or otherwise inspect the interior of the monitoring device for termites and/or introduce a termiticide into the monitoring device through the hole in the closure component, the indicator mechanism or the signal component of the indicator mechanism with or without the upper portion of the trigger mechanism can be inserted back into the hole of the closure component with or without the signal component projecting above the closure component to continue indicating that the monitoring device has detected the presence of termites or a separate closure may be used to close and seal the hole of the closure component.

While the termite-monitoring device of the subject invention has been shown as a complete unit, other termite monitors and/or bait stations (such as but not limited to termite monitors and monitoring stations marketed by FMC® under the trade designation First Line) Termite Defense System™) can be retrofitted with the closure component and trigger and termite indicator mechanisms of the termite-monitoring device of the subject invention. While it is preferred to use a trigger mechanism with nontoxic termite food portion, it is contemplated that the termite food portion of the trigger mechanism could be toxic to termites.

DESCRIPTION OF THE PREFERRED EMBODIMENTS

In the method of the subject invention for detecting the presence of and exterminating termites by exposing the termites to a termiticide, one or more termite-monitoring devices such as the termite-monitoring device 20 or another termite-monitoring device of the subject invention are located in ground adjacent a building structure 10. Preferably, the one or more termite-monitoring devices each contain a nontoxic termite food source and have a termite indicator mechanism for indicating the presence of termites within the monitoring device that provides an aboveground visible signal that termites are present within the monitoring device. Preferably, the termite-monitoring devices each have a trigger mechanism therein that includes a nontoxic termite food source. When termites feed upon the nontoxic termite food source, the termite indicator mechanism is actuated to provide a visible signal that indicates termites are present in the monitoring device. Once a termite-monitoring device indicates the presence of termites, a termiticide is introduced into the monitoring device and/or the ground adjacent the monitoring device to expose the termites to the termiticide as the termites pass between a termite colony and the monitoring device and/or feed within the monitoring device.

Figure 1:
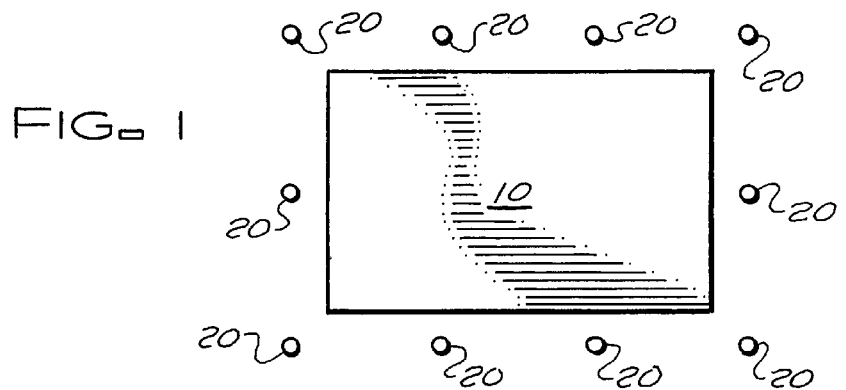
FIG. 1 is a schematic plan view of a building with a plurality of termite-monitoring devices positioned about the building to detect the presence of termites.
Figure 2:
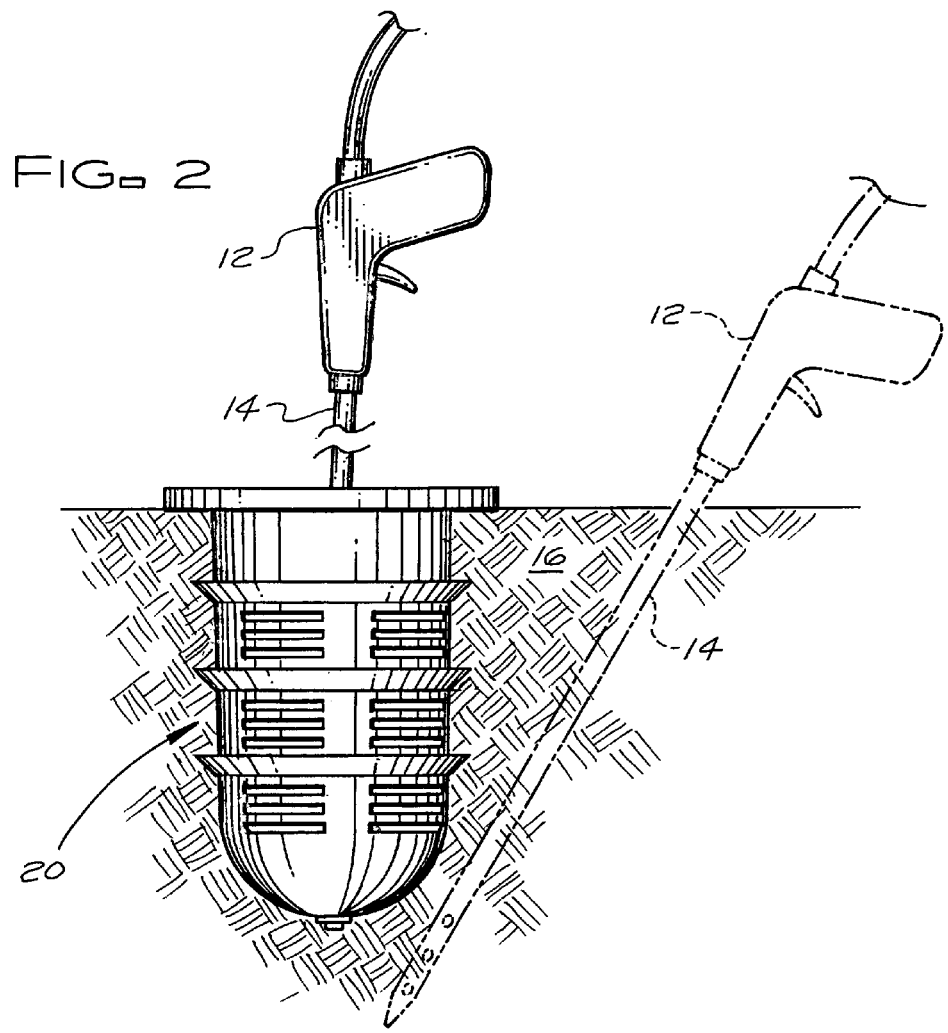
FIG. 2 is a side view of a termite-monitoring device of the subject invention in the ground showing how a termiticide may be introduced into the monitoring device and/or the ground adjacent the monitoring device.
Figure 3:
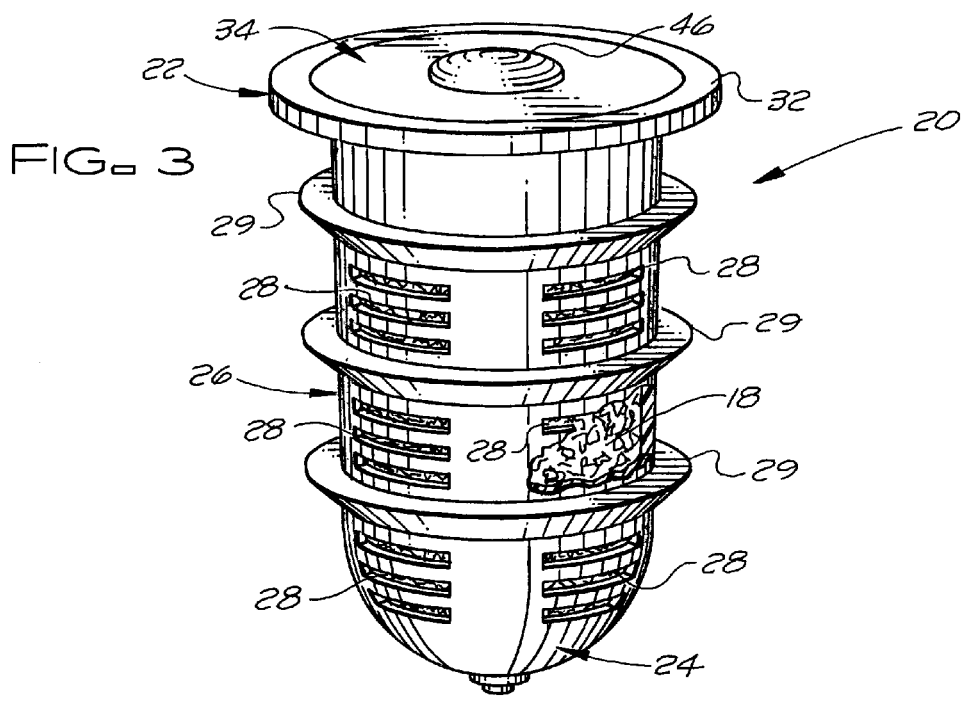
FIG. 3 is a perspective view of one embodiment termite-monitoring device of the subject invention with a portion broken away to show a termite food source within the device.
Figure 4:
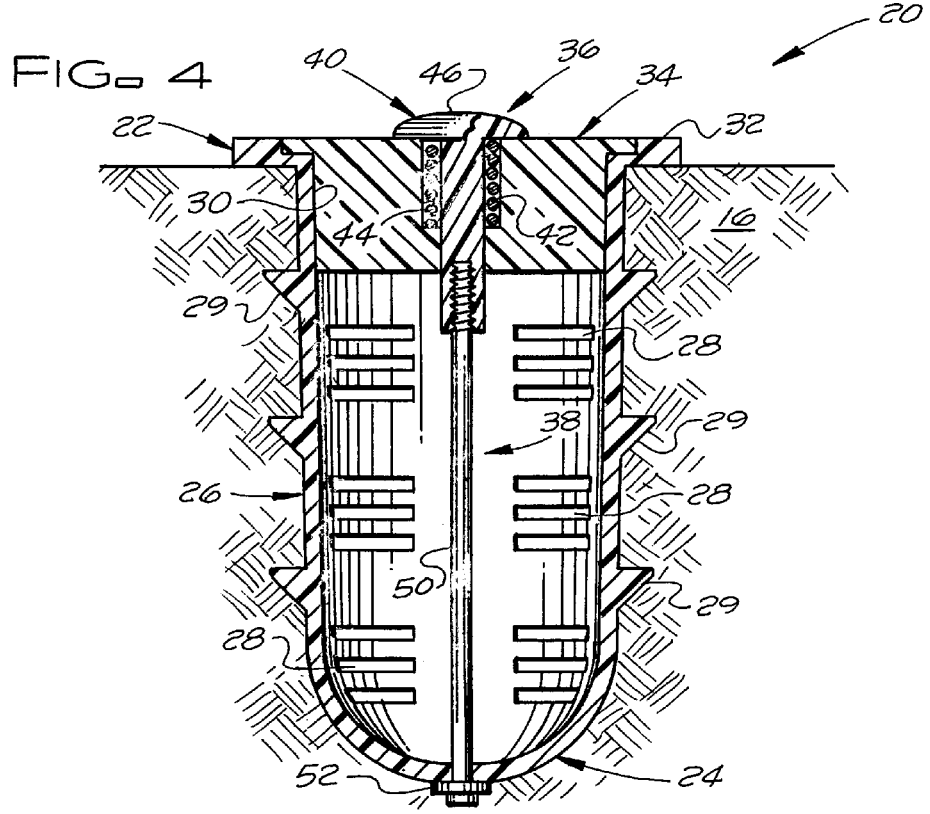
FIG. 4 is a vertical cross section through the monitoring device of FIG. 3, with the termite food source removed, placed in the ground with the rod of the trigger mechanism intact.

FIG. 2 shows an applicator 12, in solid line, introducing a termiticide under pressure through an apertured dispensing tube 14 into a termite-monitoring device 20 from a termiticide source, e.g. a liquid termiticide source under pressure not shown, after the detection of termites. FIG. 2 also shows an applicator 12, in phantom line, introducing a termiticide under pressure through an apertured dispensing tube 14 into the ground 16 adjacent the termite-monitoring device 20, including the ground beneath the monitoring device. The termiticide may be introduced into the ground 16 adjacent the termite-monitoring device at one or more locations, e.g. locations spaced from each other in a circle about the monitoring device 20 by intervals of 90°. Preferably, the termiticide is introduced into the ground 16 adjacent the termite-monitoring device 20 until the ground adjacent the termite-monitoring device is saturated with the termiticide. While, for illustrative purposes, the application of termiticides in accordance with the method of the subject invention has been shown in connection with the termite-monitoring device 20, the method of the subject invention can also be used with other embodiments of termite-monitoring devices of the subject invention.

The first preferred termite-monitoring device 20 of the subject invention for use in the method of the subject invention is shown in FIGS. 3 to 6. The components of the termite-monitoring device 20 are made of durable materials, such as but not limited to polyethylene or other durable polymeric materials, metal, or other durable materials. The termite-monitoring device 20 has a tubular housing for containing a termite food source 18. A housing of a typical termite-monitoring device 20 is about 2.5 to 4 inches in diameter by about 6 to 8 inches in height. The housing has an upper end 22, a lower end 24, and a tubular sidewall 26 with a plurality of openings 28 therein, intermediate the upper end and the lower end of the housing, to permit below ground termite ingress and egress. Preferably, the housing also includes one or more anchoring ribs, such as but not limited to the annular ribs 29, or sets of anchoring barbs not shown (the barbs of each set would be spaced from each other about the circumference of the housing) on the outer surface of the sidewall 26 to securely anchor the termite-monitoring device 20 in the ground. The housing may have other than a cylindrical configuration. The upper end 22 of the housing includes an opening 30 and an outwardly extending annular flange 32 that typically rests on the surface of the ground 16.

A closure component, as shown a plug closure component 34, is bonded, threaded into, or otherwise permanently or removably secured within the opening 30 in the upper end of the housing and has a termite indicator mechanism 36 therein that is actuated by a trigger mechanism 38. The termite indicator mechanism 36 includes a signal component 40 and a coil spring 42. While the trigger mechanism 38 is intact, the signal component 40 and spring 42 are housed within a central hole 44 that extends from topside to a bottom side of the plug closure component 34. The signal component 40 has an upper head portion 46 and a shank portion 48. When the trigger mechanism 38 is intact, the signal component is held in a first position with underside of the head portion 46 resting on the topside of the plug closure component 34 and the shank portion 48 of the signal component is slidably received within a smaller diameter lower end portion of the hole 44. A larger diameter upper end portion of the hole 44 houses the spring 42. The spring 42 extends between an annular ledge created at the juncture of the upper and lower hole portions and the underside of the head portion 46 of the signal component. While the trigger mechanism 38 is intact the spring 42 exerts an upward force on both the signal component 40 and the trigger mechanism 38.

The trigger mechanism 38 includes a rod 50 that is threaded into, bonded to, or otherwise secured to the lower end of the shank portion 48 of the signal component. The rod 50 extends from the termite indicator mechanism 36 through the tubular housing to the bottom wall 24 of the housing where a bottom end portion of the rod 50 is threaded into or otherwise secured to the bottom of the housing by a conventional retainer 52. The rod 50 of the trigger mechanism 38 includes, at least in part, a termite food source portion, e.g. a wooden portion and, as shown, may be made entirely of a wood such as but not limited to southern pine. When the termite food source portion of the rod 50 is partially consumed by termites the rod is weakened until the rod is separable at the termite food portion by the force applied to the trigger mechanism 38 by the spring 42 of the termite indicator mechanism 36.

Figure 5:
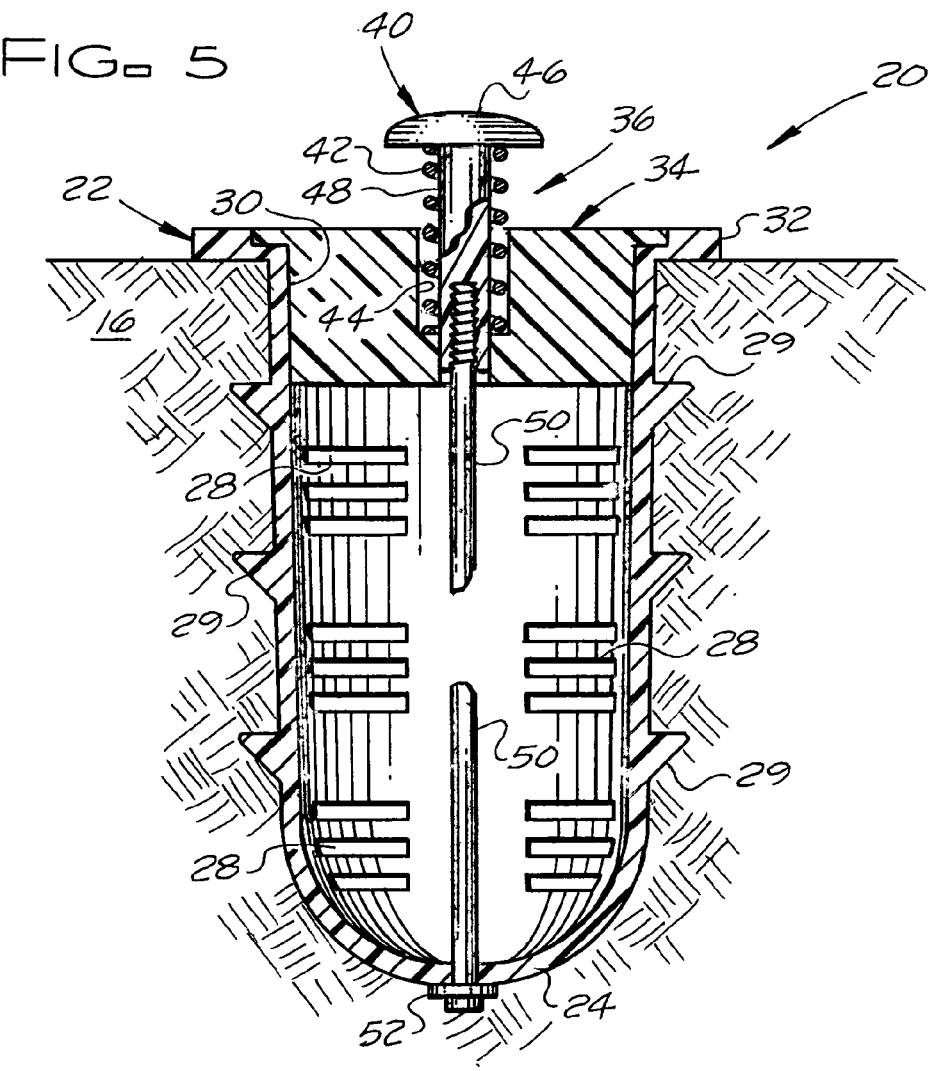
FIG. 5 is a vertical cross section through the monitoring device of FIG. 3, with the termite food source removed, placed in the ground with the rod of the trigger mechanism separated.
Figure 6:
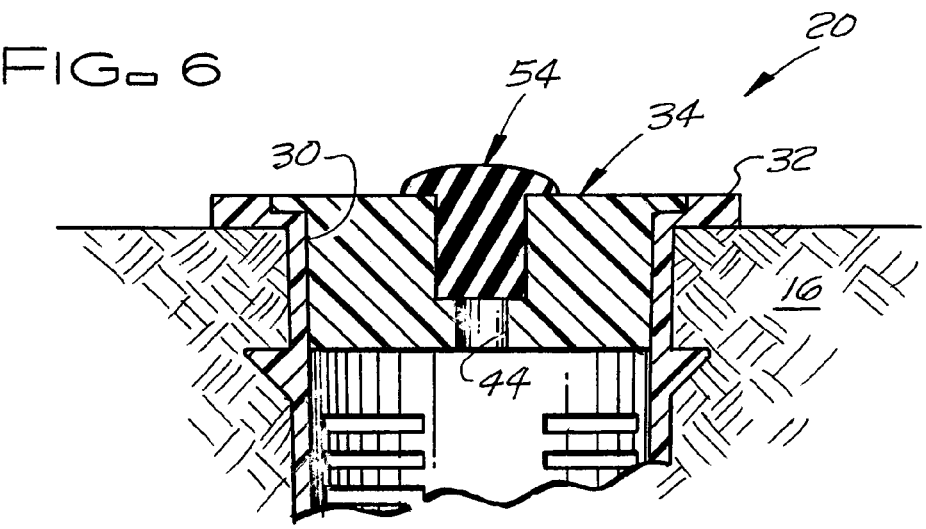
FIG. 6 is a vertical cross section through the upper portion of the monitoring device of FIG. 3 after the termite indicator mechanism has been removed from a hole in the closure component and a closure inserted into the hole previously housing the termite indicator mechanism.

When the rod 50 of the trigger mechanism 38 is weakened at the termite food source portion by feeding termites, the forces exerted on the termite food source portion of the rod 50 by the spring 42 separate the rod so that the rod of the trigger mechanism, as shown in FIG. 5, is no longer intact. Simultaneously with the separation of the rod 50, the spring 42 urges the signal component 40 of the termite indicator mechanism 36 upward from the first position to a second elevated position where the upper end head portion 46 of the signal component 40 projects several inches or more above the top side of the plug closure component 34 and is clearly visible above the plug closure component 34 to indicate the presence of termites within the termite-monitoring device.

After the rod 50 of the trigger mechanism 38 has been separated and the upper end head portion 46 of the signal component 40 projects above the upper surface of the plug closure component 34 to provide the visible signal above the plug closure component that termites are present within the monitoring device, the termite indicator mechanism 36 along with an upper portion of the rod 50 of the trigger mechanism 38 may be pulled from the plug closure component to clear the hole 44 in the plug closure component 34 so that the interior of the housing may be visibly or otherwise inspected and/or a termiticide can be introduced into the termite-monitoring device 20 through the plug closure component 34. After the interior of the housing has been inspected and/or a termiticide has been introduced into the termite-monitoring device 20 through the hole 44 in the plug closure component 34, the termite indicator mechanism 36 with or without the upper portion of the rod 50 of the trigger mechanism 38 can be inserted back into the hole 44 with the signal component 40 projecting above the plug closure component 34 to continue indicating that the termite-monitoring device 20 has detected the presence of termites; the signal component without the spring and with or without the upper portion of the rod 50 of the trigger mechanism may be inserted back into the hole 44 to seal the hole 44; or a hole closure 54, such as that shown in FIG. 6, may be inserted into the hole 44 of the plug closure component 34 to seal the hole and indicate that the termite-monitoring device is being serviced with termiticide. The hole closure 54 may be threaded into the hole, secured within the hole by a friction fit, or otherwise secured within the hole 44. In addition, the upper end portion of the hole closure 54 may have a distinctive color and/or configuration (including projecting above the plug closure component 34 in a manner identical to or similar to the signal component 40) to indicate that termites have been detected in the termite-monitoring device 20 and the termite-monitoring device is being serviced to exterminate termites with a termiticide.

Figure 7:
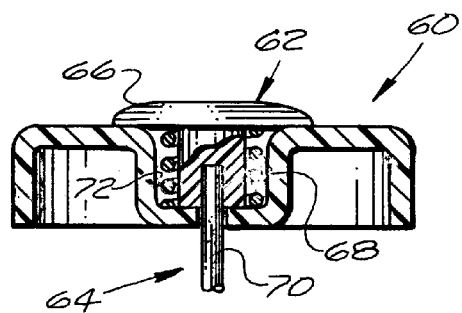
FIG. 7 is a transverse vertical cross section of a plug/cap closure component of the subject invention that is an alternative to the plug closure component of FIGS. 4 to 6.
Figure 8:
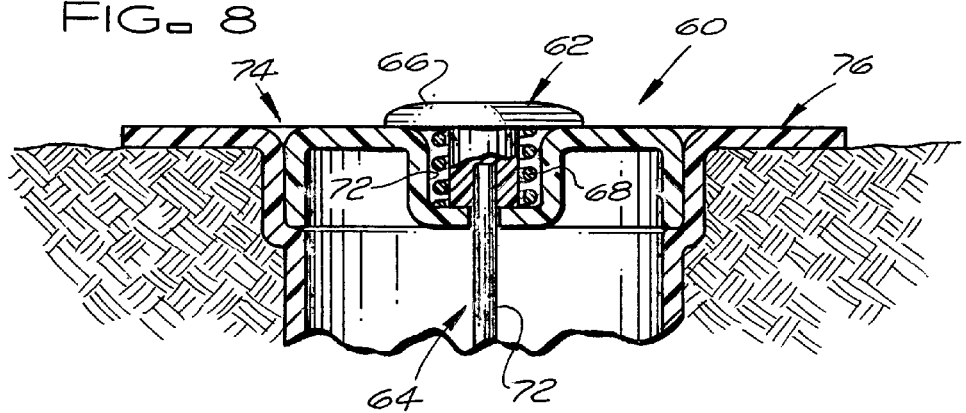
FIG. 8 shows a partial transverse cross section through a monitoring device equipped with the plug/cap closure component of the subject invention, prior to the actuation of the trigger mechanism, wherein the plug/cap closure component is being used as a plug closure component.
Figure 9:
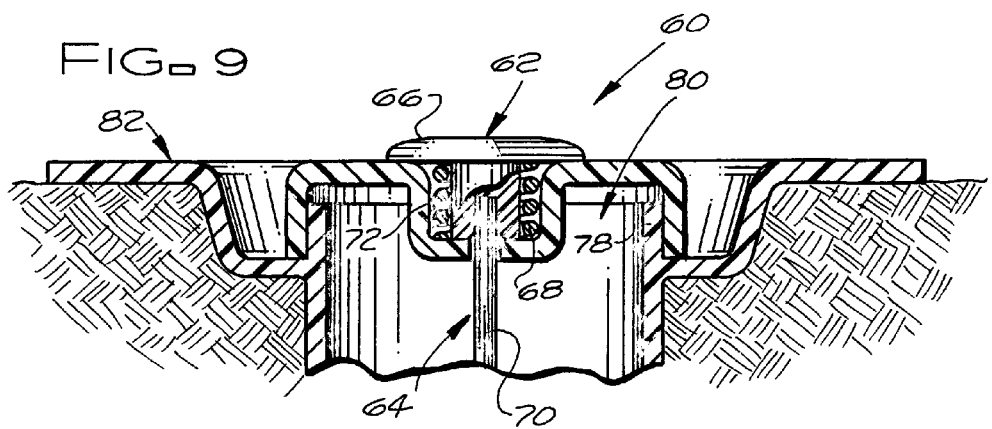
FIG. 9 shows a partial transverse cross section through a monitoring device equipped with the plug/cap closure component of the subject invention, prior to the actuation of the trigger mechanism, wherein the plug/cap closure component is being used as a cap closure component.

FIGS. 7 to 9 show a closure component 60 (a plug/cap closure component) that is an alternative to the closure component 34 of FIGS. 2 to 6. The plug/cap closure component includes a termite indicator mechanism 62 that is substantially the same as the termite indicator mechanism 36 of the plug closure component 34 and a trigger mechanism 64 (only partially shown) that is the same as the trigger mechanism 38 of the plug closure component 34. The termite indicator mechanism 62 includes a signal component 66 and a coil spring 68. The termite indicator mechanism 62 of the plug/cap closure component 60 is the same as the termite indicator mechanism 36 of the plug closure component 34 with one exception, the upper end of the trigger mechanism rod 70 passes up through the reduced diameter portion of the stepped diameter hole 72 in the plug/cap closure component 60 and the shank of the signal component 66 does not extend down into the reduced diameter portion of the hole. Otherwise, the termite indicator mechanism and trigger mechanism of the plug/cap closure component 60 and monitoring devices of FIGS. 7 to 9 are the same as and function the same as the termite indicator mechanism and trigger mechanism of the monitoring device of FIGS. 2 to 6. The plug/cap closure component 60 may be used as a plug closure component as shown in FIG. 8 or a cap closure component as shown in FIG. 9. As shown in FIG. 8, the plug/cap closure component 60 is bonded, threaded into, or otherwise permanently or removably secured within the opening 74 in the upper end of a housing 76. As shown in FIG. 9, the plug/cap closure component 60 is bonded, threaded onto, or otherwise permanently or removably secured over an annular rib 78 adjacent the opening 80 in the upper end of a housing 82.

Figures 10, 11:
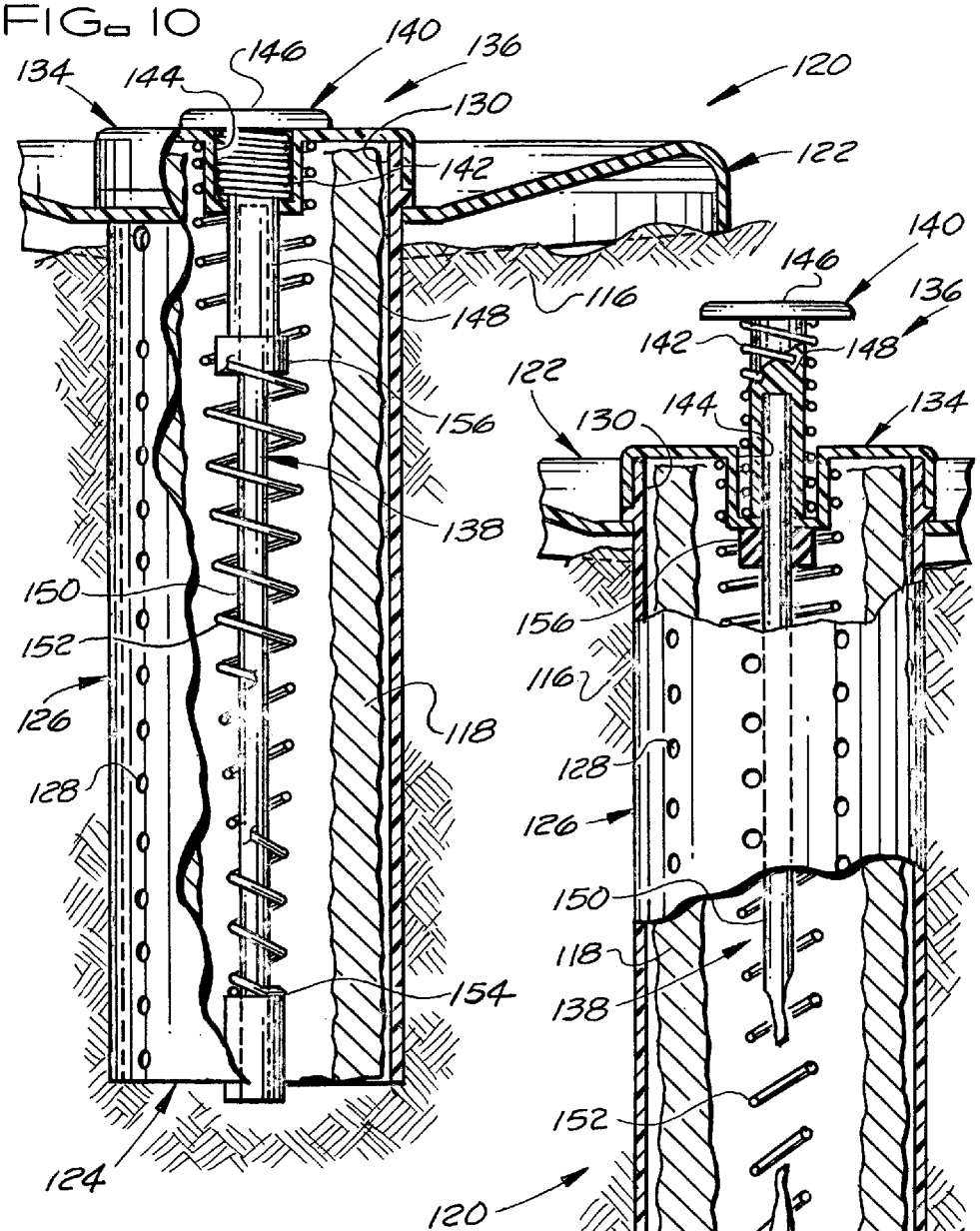
FIG. 10 is a view, partially in vertical cross section, of another embodiment of the monitoring device of the subject invention placed in the ground with the rod of the trigger mechanism intact.
FIG. 11 is a view, partially in vertical cross section, of the monitoring device of FIG. 10 placed in the ground with the rod of the trigger mechanism separated.

A second preferred termite-monitoring device 120 of the subject invention for use in the method of the subject invention is shown in FIGS. 10 and 11. The components of the termite-monitoring device 120 are made of durable materials, such as but not limited to polyethylene or other durable polymeric materials, metal, or other durable materials. The termite-monitoring device 120 has a tubular housing for containing a termite food source 118. A housing of a typical termite-monitoring device 120 is about 2.5 to 4 inches in diameter by about 6 to 8 inches in height. The typical housing has an upper end 122, a lower end 124, a tubular sidewall 126 and an opening or a plurality of openings, such as openings 128, to permit below ground termite ingress and egress. To permit below ground termite ingress and egress, the lower end 124 of the housing may be open, as shown, or closed and the housing may have a plurality of openings 128 in the sidewall, as shown, or may only be open at the lower end. The housing may also include one or more anchoring ribs or sets of anchoring barbs (the barbs of each set would be spaced from each other about the circumference of the housing) on the outer surface of the sidewall 126 to securely anchor the termite-monitoring device 120 in the ground. The housing may have other than a cylindrical configuration. The upper end 122 of the housing includes an opening 130 and typically, an outwardly extending annular flange 132 that normally rests on the surface of the ground 116.

A closure component 134 is secured within the opening 130 in the upper end of the housing as a plug or, as shown in FIGS. 10 and 11, over the opening 130 in the upper end of the housing as a cap and has a termite indicator mechanism 136 therein that is actuated by a trigger mechanism 138. The termite indicator mechanism 136 includes a signal component 140 and a coil spring 142. While the trigger mechanism 138 is intact, the signal component 140 and spring 142 are housed within a central hole 144 that extends from topside to a bottom side of the closure component 134. The signal component 140 has an upper head portion 146 and a shank portion 148. When the trigger mechanism 138 is intact, the signal component is held in a first position with underside of the head portion 146 resting on the topside of the closure component 134 and the shank portion 148 of the signal component is slidably received within a smaller diameter lower end portion of the hole 144. A larger diameter upper end portion of the hole 144 houses the spring 142. The spring 142 extends between an annular ledge created at the juncture of the upper and lower hole portions and the underside of the head portion 146 of the signal component. While the trigger mechanism 138 is intact the spring 142 exerts an upward force on both the signal component 140 and the rod of the trigger mechanism 138.

The trigger mechanism 138 includes a rod 150 that is threaded into, bonded to, or otherwise secured to the lower end of the shank portion 148 of the signal component. The rod 150 extends from the termite indicator mechanism 136 into the tubular housing where a bottom end portion of the rod 150 is engaged by a spacer 152 to maintain the bottom end portion of the rod spaced below the closure component and the signal component 140 within the closure component while the rod 150 is intact. The rod 150 of the trigger mechanism 138 includes, at least in part, a termite food source portion, e.g. a wooden portion and, as shown, may be made entirely of a wood such as but not limited to southern pine. While the spacer 152 could be a rigid tubular spacer with openings for termites to gain access to the rod 150 of the trigger mechanism for feeding on the termite food source portion of the rod, preferably, the spacer 152 is a spring that abuts the underside of the closure component at its upper end and an upper side of a flange 154 of the rod 150 at its lower end to permit termites to gain access to the rod 150 of the trigger mechanism for feeding on the termite food source portion of the rod and to place a downward force on the rod 150 of the trigger mechanism 138. When the termite food source portion of the rod 150 is partially consumed by termites the rod is weakened until the rod is separable at the termite food portion by the force applied to the trigger mechanism 138 by the spring 142 of the termite indicator mechanism 136 or by the spring 142 of the termite indicator mechanism and the spacer 152 when the spacer is a spring.

When the rod 150 of the trigger mechanism 138 is weakened at the termite food source portion by feeding termites, the forces exerted on the termite food source portion of the rod 150 by the spring 142 and, where the spacer is a spring, by the spacer 152 separate the rod so that the rod of the trigger mechanism, as shown in FIG. 11, is no longer intact. Simultaneously with the separation of the rod 150, the spring 142 urges the signal component 140 of the termite indicator mechanism 136 upward from the first position to a second elevated position where the upper end head portion 146 of the signal component 140 projects several inches or more above the top side of the closure component 134 and is clearly visible above the closure component 134 to indicate the presence of termites within the termite-monitoring device.

An upper end portion of the rod 150 or a lower end portion of the signal component shank 148 may be provided with a collar 156, affixed to the upper end portion of the rod 150 or the lower end portion of the signal component shank 148. When the signal component 140 is activated and extended up beyond the upper surface of the closure component 134 by the action of the spring 142, the collar 156, which is larger in diameter than the hole 144, contacts the underside of the closure component 134 around the hole 144 to limit the extent to which the upper end head portion of the signal component projects above the upper surface of the closure component 134.

When the collar 156 is not used, after the rod 150 of the trigger mechanism 138 has been separated and the upper end head portion 146 of the signal component 140 projects above the upper surface of the closure component 134 to provide the visible signal above the closure component that termites are present within the monitoring device, the termite indicator mechanism 136 along with an upper portion of the rod 150 of the trigger mechanism 138 may be pulled from the closure component to clear the hole 144 in the closure component 134 so that the interior of the housing may be visibly or otherwise inspected and/or a termiticide can be introduced into the termite-monitoring device 120 through the closure component 134. After the interior of the housing has been inspected and/or a termiticide has been introduced into the termite-monitoring device 120 through the hole 144 in the closure component 134, the termite indicator mechanism 136 with or without the upper portion of the rod 150 of the trigger mechanism 138 can be inserted back into the hole 144 with the signal component 140 projecting above the closure component 134 to continue indicating that the termite-monitoring device 120 has detected the presence of termites; the signal component without the spring and with or without the upper portion of the rod 150 of the trigger mechanism may be inserted back into the hole 144 to seal the hole 144; or a hole closure, such as that shown in FIG. 6, may be inserted into the hole 144 of the closure component 134 to seal the hole and indicate that the termite-monitoring device is being serviced with termiticide. The hole closure may be threaded into the hole, secured within the hole by a friction fit, or otherwise secured within the hole 144. In addition, the upper end portion of the hole closure may have a distinctive color and/or configuration (including projecting above the closure component 134 in a manner identical to or similar to the signal component 140) to indicate that termites have been detected in the termite-monitoring device 120 and the termite-monitoring device is being serviced to exterminate termites with a termiticide.

Various commercially available termiticides can be used in the method of the subject invention, such as but not limited to termiticides that are non-repellent to termites and lethal or injurious to termites through matrix contact as well as through ingestion and/or transferal. An example of a preferred termiticide, which is non-repellent to termites and lethal to termites through matrix contact as well as through ingestion and/or transferal, is a termiticide containing fipronil as its active ingredient. BASF Corporation of Mount Olive, N.J. sells such a termiticide under the trade designation "TERMIDOR". Since the termites do not smell, feel, or otherwise detect this type of termiticide, the termites continue to pass freely through an area treated with such a termiticide picking up the termiticide and carrying the termiticide back to the colony nest. In the colony nest, other termites that contact the contaminated termites through feeding or grooming or through cannibalizing the termites killed by the termiticide become carriers of the termiticide thereby spreading the termiticide throughout the colony.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method for detecting the presence of termites and killing termites by exposing the termites to a termiticide, comprising:

locating a monitoring device in ground adjacent a building structure; the monitoring device comprising a tubular housing having an upper end, a lower end, and a tubular sidewall extending between the upper end and the lower end of the housing; the upper end of the housing having an opening therein; the tubular housing having opening means therein to permit below ground housing ingress and egress by termites; a closure component closing the opening in the upper end of the housing; the closure component having a top side, a bottom side, and a hole passing from the top side to the bottom side; the closure component including the termite indicator mechanism that is actuated by a trigger mechanism; the trigger mechanism comprising a rod means that is secured to and extends from the termite indicator mechanism into the tubular housing; means maintaining a signal component of the termite indicator mechanism in a first position when the rod means of the trigger mechanism is intact comprising a spacer means that extends between the bottom side of the closure component and a lower portion of the rod means and engages a lower portion of the rod means to maintain the lower portion of the rod means in a spaced relationship to the closure component; the rod means of the trigger mechanism comprising, at least in part, a termite food source portion of the trigger mechanism that when being consumed by termites weakens until the rod means is separable at the termite food source portion by a force applied to the trigger mechanism at least in part by the termite indicator mechanism; the signal component of the termite indicator mechanism having an upper portion, a shank portion, and being at least partially housed within the hole of the closure component; and the termite indicator mechanism including a spring, housed within the hole of the closure component, that is a force applying means for applying a force to the rod means of the trigger mechanism to separate the rod means at the termite food source portion when the rod means is weakened at the termite food source portion and, when rod means of the trigger mechanism has been separated at the termite food source portion, for urging the signal component upward from the first position to a second elevated position where the upper portion of the signal component projects above the top side of the closure component to provide a visible signal above the closure component that termites are present within the monitoring device; and introducing a termiticide into the monitoring device and/or the ground adjacent the monitoring device, after the termite indicator mechanism of the monitoring device has been actuated to provide the visible signal that termites are present within the monitoring device, to expose the termites to the termiticide as the termites pass between a termite colony and the monitoring device and/or feed within the monitoring device.

2. The method for detecting the presence of termites and killing termites by exposing the termites to a termiticide according to claim 1, wherein:

the termiticide is introduced into the monitoring device, after the termite indicator mechanism of the monitoring device has been actuated to provide the visible signal that termites are present within the monitoring device, to expose the termites to the termiticide when the termites are within the monitoring device.

3. The method for detecting the presence of termites and killing termites by exposing the termites to a termiticide according to claim 1, wherein:

the termiticide introduced into the ground adjacent the monitoring device, after the termite indicator mechanism of the monitoring device has been actuated to provide the visible signal that termites are present within the monitoring device, is introduced into the ground beneath and along side of the monitoring device to expose the termites to the termiticide as the termites pass between the termite colony and the monitoring device.

4. The method for detecting the presence of termites and killing termites by exposing the termites to a termiticide according to claim 1, wherein:

the spacer means is a spring that both maintains the lower portion of the rod means spaced from the closure component and exerts a downward force on the lower portion of the rod means to facilitate the separation of the rod means at the termite food portion when the rod means is weakened at the termite food portion as the termite food portion is being consumed by termites.

5. The method for detecting the presence of termites and killing termites by exposing the termites to a termiticide according to claim 4, wherein:

after the rod of the trigger mechanism has been separated and the signal component has been urged upward to the second elevated position where the upper portion of the signal component projects above the top side of the closure component to provide the visible signal above the closure component that termites are present within the monitoring device, the indicator mechanism, along with an upper portion of the trigger mechanism, are removed from the closure component to clear the hole in the closure component so that an interior of the housing can be inspected and/or the termiticide can be introduced into the monitoring device through the closure component; and the termiticide is introduced into the monitoring device through the hole in the closure component to expose the termites to the termiticide when the termites are within the monitoring device.

6. The method for detecting the presence of termites and killing termites by exposing the termites to a termiticide according to claim 4, wherein:

the termiticide introduced into the ground adjacent the monitoring device, after the termite indicator mechanism of the monitoring device has been actuated to provide the visible signal that termites are present within the monitoring device, is introduced into the ground beneath and along side of the monitoring device to expose the termites to the termiticide as the termites pass between the termite colony and the monitoring device.

7. A termite-monitoring device with an integral termite indicator, comprising:

a monitoring device comprising a tubular housing having an upper end, a lower end, and a tubular sidewall extending between the upper end and the lower end of the housing; the upper end of the housing having an opening therein; the tubular housing having opening means therein to permit below ground housing ingress and egress by termites; and a closure component closing the opening in the upper end of the housing; the closure component having a top side, a bottom side, and a hole passing from the top side to the bottom side; the closure component including the termite indicator mechanism that is actuated by a trigger mechanism; the trigger mechanism comprising a rod means that is secured to and extends from the termite indicator mechanism into the tubular housing; means maintaining a signal component of the termite indicator mechanism in a first position when the rod means of the trigger mechanism is intact comprising a spacer means that extends between the bottom side of the closure component and a lower portion of the rod means and engages a lower portion of the rod means to maintain the lower portion of the rod means in a spaced relationship to the closure component; the rod means of the trigger mechanism comprising, at least in part, a termite food source portion that when being consumed by termites weakens until the rod means is separable at the termite food source portion by a force applied to the trigger mechanism at least in part by the termite indicator mechanism; the signal component of the termite indicator mechanism having an upper portion, a shank portion, and being at least partially housed within the hole of the closure component; and the termite indicator mechanism including a spring, housed within the hole of the closure component, that is a force applying means for applying a force to the rod means of the trigger mechanism to separate the rod means at the termite food source portion when the rod means is weakened at the termite food source portion and, when the rod means of the trigger mechanism has been separated at the termite food source portion, for urging the signal component upward from the first position to a second elevated position where the upper portion of the signal component projects above the top side of the closure component to provide a visible signal above the closure component that termites are present within the monitoring device.

8. The termite-monitoring device with the integral termite indicator according to claim 7, wherein:

the spacer means is a spring that maintains the lower portion of the rod means spaced from the closure component and exerts a downward force on the lower portion of the rod means to facilitate the separation of the rod means at the termite food source portion when the rod means is weakened at the termite food source portion as the termite food source portion is being consumed by termites.

9. The termite-monitoring device with an integral termite indicator, according to claim 7, wherein:

after the rod of the trigger mechanism has been separated and the signal component has been urged upward to the second elevated position where the upper portion of the signal component projects above the top side of the closure component to provide the visible signal above the closure component that termites are present within the monitoring device, the indicator mechanism, along with an upper portion of the trigger mechanism, may be pulled from the closure component to clear the hole of the closure component so that an interior of the housing may be inspected and/or a termiticide can be introduced into the monitoring device through the closure component.

10. The termite-monitoring device with an integral termite indicator, according to claim 7, wherein:

the closure component is a cap component that fits over an upwardly projecting annular rib of the opening in the upper end of the housing.

11. A signal mechanism for a termite-monitoring device, comprising:

a closure component for closing an opening in the upper end of a tubular housing of a termite-monitoring device; the closure component having a top side, a bottom side, and a hole passing from the top side to the bottom side; the closure component including the termite indicator mechanism that is actuated by a trigger mechanism; the trigger mechanism comprising a rod means that is secured to the termite indicator mechanism and is adapted to extend down into a tubular housing of a termite-monitoring device; means maintaining a signal component of the termite indicator mechanism in a first position when the rod means of the trigger mechanism is intact comprising a spacer means that extends between the bottom side of the closure component and a lower portion of the rod means and engages a lower portion of the rod means to maintain the lower portion of the rod means spaced from the closure component; the rod means of the trigger mechanism comprising, at least in part, a termite food source portion that when being consumed by termites weakens until the rod means is separable at the termite food source portion by a force applied to the trigger mechanism at least in part by the termite indicator mechanism; the signal component of the termite indicator mechanism having an upper portion, a shank portion, and being at least partially housed within the hole of the closure component; and the termite indicator mechanism including a spring, housed within the hole of the closure component, that is a force applying means for applying a force to the rod means of the trigger mechanism to separate the rod means at the termite food source portion when the rod means is weakened at the termite food source portion and, when the rod means of the trigger mechanism has been separated at the termite food source portion, for urging the signal component upward from the first position to a second elevated position where the upper portion of the signal component projects above the top side of the closure component to provide a visible signal above the closure component that termites are present within the monitoring device.

12. The signal mechanism for a termite-monitoring device according to claim 11, wherein:

the spacer means is a spring that maintains the lower portion of the rod means spaced from the closure component and exerts a downward force on the lower portion of the rod means to facilitate the separation of the rod means at the termite food source portion when the rod means is weakened at the termite food source portion as the termite food source portion is being consumed by termites.

13. The signal mechanism for a termite-monitoring device, according to claim 11, wherein:

after the rod of the trigger mechanism has been separated and the signal component has been urged upward to the second elevated position where the an upper portion of the signal component projects above the top side of the closure component to provide the visible signal above the closure component that termites are present within a termite-monitoring device equipped with the signal mechanism, the indicator mechanism along with an upper portion of the trigger mechanism may be pulled from the closure component to clear the hole in the closure component so that an interior of a housing of a termite-monitoring device equipped with the signal mechanism may be inspected and/or a termiticide can be introduced into the termite-monitoring device through the closure component.

\* \* \* \* \*